United States Patent
Tsai

Patent Number: 5,555,795
Date of Patent: Sep. 17, 1996

[54] BAKING POT

[76] Inventor: Shu-Yen Tsai, No. 292, Sec. 2, Chung-Shan Rd., Tsun-Shan Tsun, Ta-Tsun Hsiang, Changhua County, Taiwan

[21] Appl. No.: 599,854

[22] Filed: Feb. 12, 1996

[51] Int. Cl.⁶ ............................. A47J 37/00; A47J 37/06
[52] U.S. Cl. ..................... 99/446; 99/400; 99/401; 99/447; 126/21 A; 126/275 R
[58] Field of Search ................. 99/444–446, 400, 99/401, 447, 450; 126/21 A, 275 R; D7/359, 658

[56] References Cited

U.S. PATENT DOCUMENTS

| | | | |
|---|---|---|---|
| D. 246,627 | 12/1977 | Sugiyama | D7/359 |
| 1,036,148 | 8/1912 | Reina | 99/447 |
| 1,344,915 | 6/1920 | Love | 99/446 X |
| 1,826,420 | 6/1932 | O'Brien | 99/446 |
| 2,042,773 | 6/1936 | Feldman | 99/446 |
| 2,573,719 | 11/1951 | Lebherz | 99/447 X |
| 3,217,634 | 11/1965 | Fox | 99/446 X |
| 3,301,172 | 1/1967 | Haro | 99/401 X |
| 3,490,357 | 1/1970 | Lescure | 99/446 X |
| 3,933,145 | 1/1976 | Reich | 99/401 X |
| 4,446,776 | 5/1984 | Gelfman | 99/401 |
| 5,431,091 | 7/1995 | Couture | 99/401 |
| 5,473,980 | 12/1995 | Carpenter | 99/446 |

*Primary Examiner*—Timothy F. Simone
*Attorney, Agent, or Firm*—Morton J. Rosenberg; David I. Klein

[57] ABSTRACT

A baking pot which includes a pot body having a hot air inlet, a trim mounted in the hot air inlet of the pot body and having a conical center hole, a turbine wheel having a wheel shaft mounted in the conical center hole of the trim by a bearing, a drip plate mounted within the pot body above the turbine wheel, a grid mounted on the pot body above the drip plate, and a pot cover covered on the pot body over the grid, the pot cover having a rotary knot, a plurality of air vents equally spaced around the rotary knob, and a shutter plate fastened to the rotary knot and turned by it to close/open the air vents of the pot cover.

3 Claims, 3 Drawing Sheets

BAKING POT

BACKGROUND OF THE INVENTION

The present invention relates to making pots, and relates more particularly to such a baking pot which has a turbine wheel mounted on the inside between the hot air inlet and the grid to guide hot air upwards in all directions for baking food evenly.

A variety of baking apparatus have been disclosed, and have appeared on the market. However, in these conventional baking apparatus, hot air from heat source is directly guided upwards to the bottom side of food. This heating method cannot evenly heat all parts of food. Sometimes, the bottom side of food is excessively burned when the top side of food is still not well cooked.

SUMMARY OF THE INVENTION

The present invention has been accomplished to provide a baking pot which eliminates the aforesaid problem.

According to one aspect of the present invention, the baking pot comprises a pot body having a bottom side and a hot air inlet at the center of the bottom side; a trim mounted in the hot air inlet of the pot body, having a conical center hole; a bearing mounted in the conical center hole of the trim; a turbine wheel having a wheel shaft turned in the bearing; a drip plate mounted within the pot body above the turbine wheel, the drip plate comprising an annular recess around the border, a plurality of radial oil grooves and radial ribs alternatively arranged at the center and surrounded by the annular recess, the radial grooves respectively downwardly slope from the center of the drip plate to the annular recess for guiding collected grease to the annular recess, each radial rib having a plurality of air vents for passing hot air from the hot air inlet; a grid mounted on the pot body above the drip plate; and a pot cover covered on the pot body over the grid. According to another aspect of the present invention, the pot cover comprises a rotary knot, a plurality of air vents equally spaced around the rotary knot, and a shutter plate fastened to the rotary knot and turned by it to close/open the air vents of the pot cover.

DETAILED DESCRIPTION OF THE PREFERRED EMBODIMENT

Figure 1:
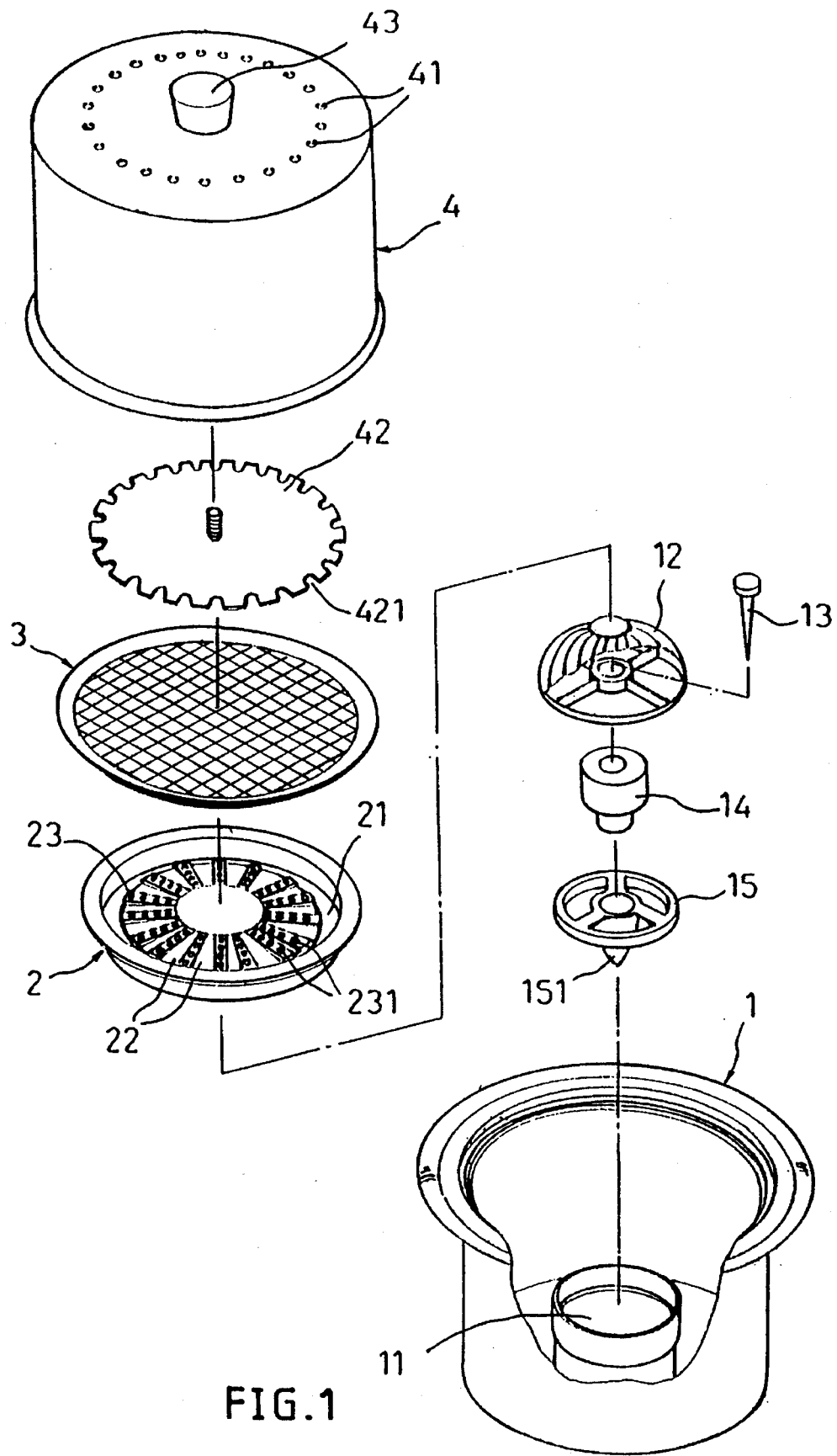
FIG. 1 is an exploded view of a baking pot according to the present invention.
Figure 2:
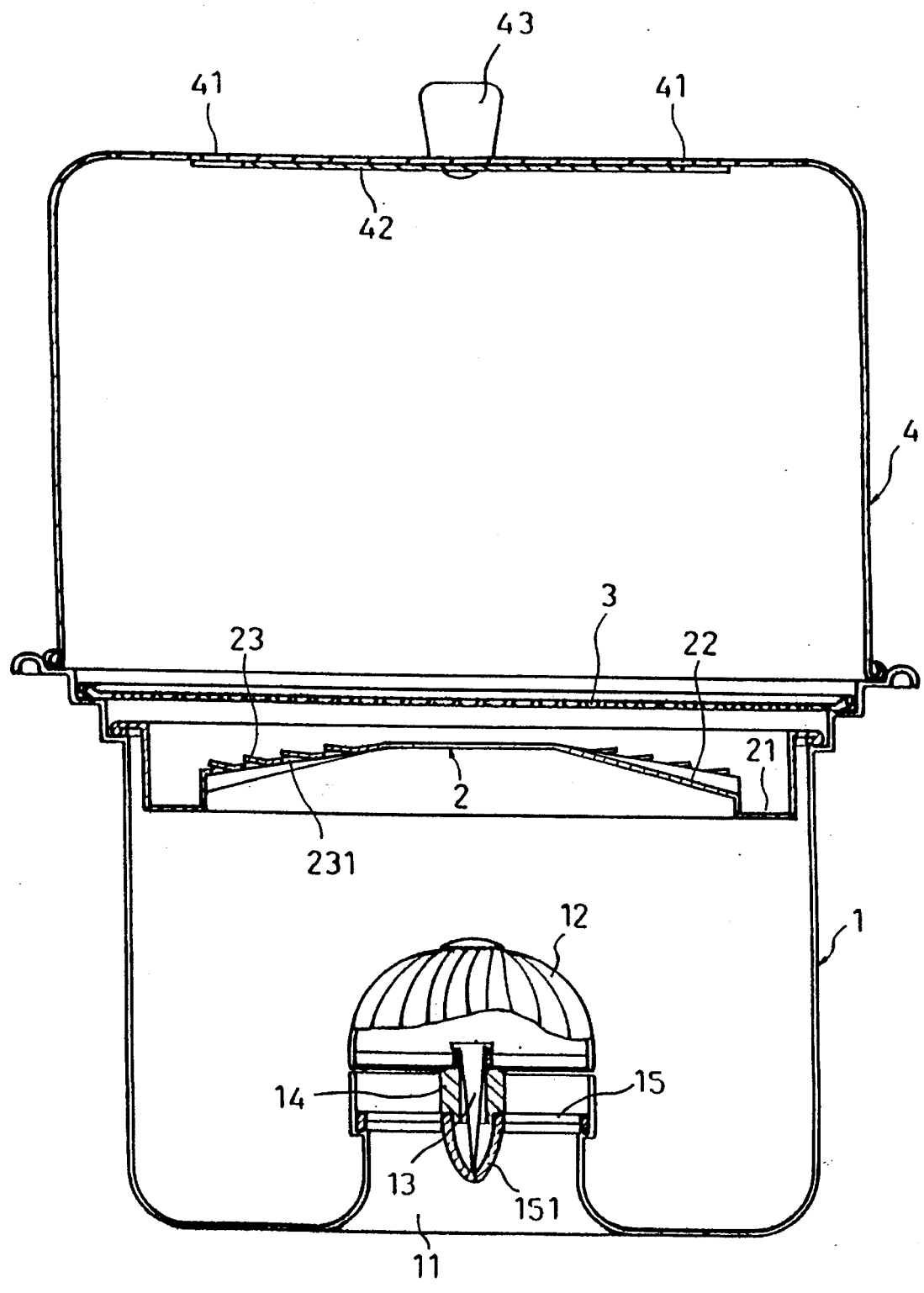
FIG. 2 is a sectional elevation of the baking pot shown in FIG. 1.

Referring to FIGS. 1 and 2, the pot body, referenced by 1, comprises a hot air inlet 11 at the center of the bottom side thereof. A trim 15 is mounted in the hot air inlet 11 inside the pot body 1, having a conical center hole 151. A bearing 14 is mounted in the conical center hole 151 of the trim 15 to hold the shaft 13 of a turbine wheel 12 in the conical center hole 151 of the trim 15. When hot air passes through the turbine wheel 12, it is distributed upwards in all directions. A drip plate 2 is mounted within the pot body 1 above the turbine wheel 12, having an annular recess 21 around the border, a plurality of radial oil grooves 22 and radial ribs 23 alternatively arranged within the annular recess 21. The radial grooves 22 respectively downwardly slope from the center of the drip plate 2 to the annular recess 21 so that collected grease can be guided to the annular recess 21. Each of the radial ribs 23 has a row of air vents 231 for passing hot air from the hot air inlet 11. A grid 3 is mounted on the pot body 1 above the drip plate 2. A pot cover 4 is covered on the pot body 1 over the grid 3, having a rotary knot 43 at the center of the top side thereof, a plurality of air vents 41 equally spaced around the rotary knob 43, and a shutter plate 42 fastened to the rotary knob 43 and disposed inside the pot cover 4. The shutter plate 42 has notches 421 equally spaced around the border corresponding to the air vents 41. By turning the rotary knob 43, the notches 421 are moved into aligned with the air vents 41, permitting hot air to escape out of the pot cover 4. When the notches 421 are not in alignment with the air vents 41, the air vents 41 are closed by the shutter plate 42, and hot air is stopped from escaping out of the pot cover 4.

Figure 3:
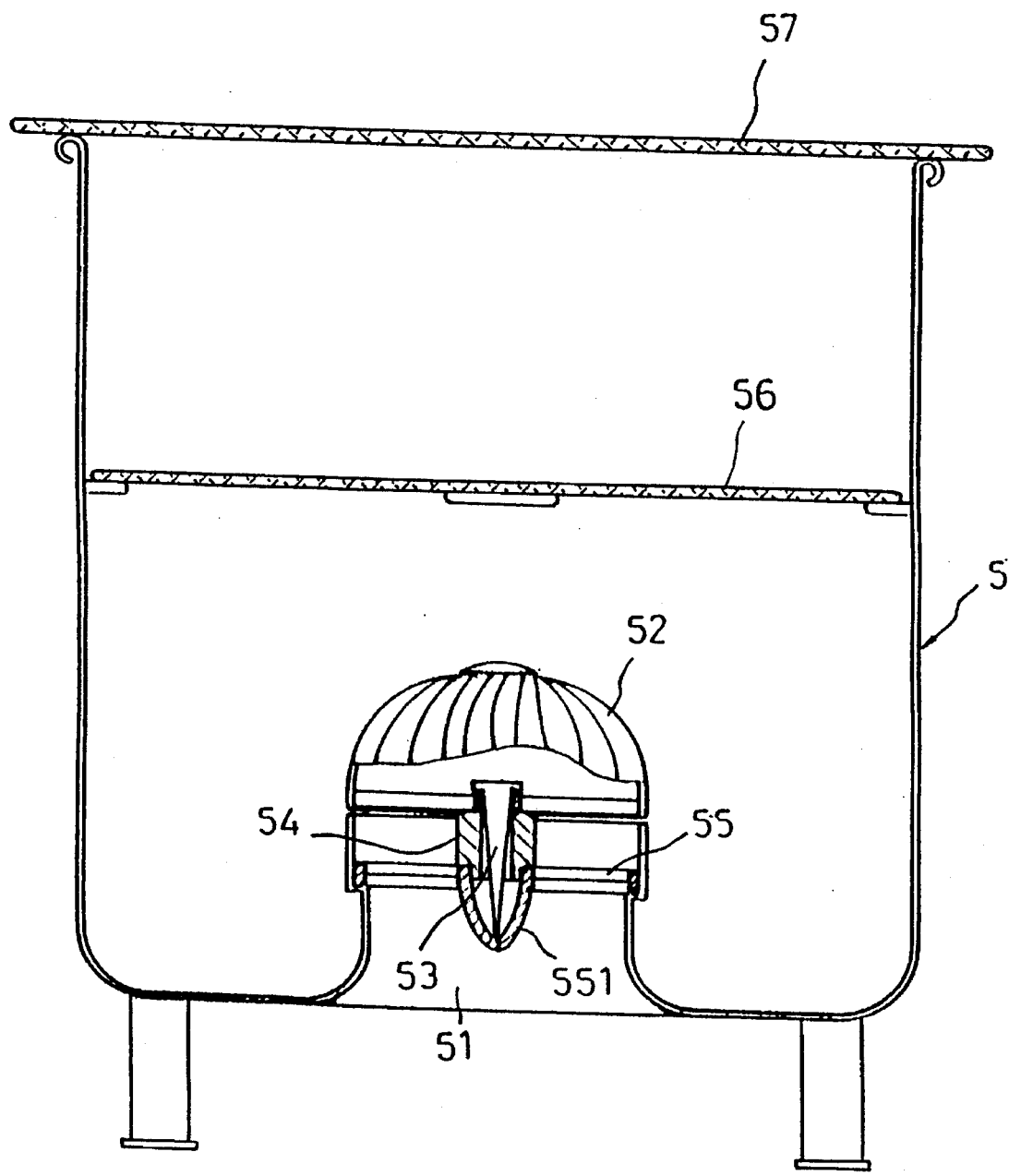
FIG. 3 is a sectional elevation of an alternate form of the baking pot according to the present invention.

FIG. 3 shows an alternate form of the present invention. This alternate form is comprised of a pot body 5 having a hot air inlet 51, a trim 55 having a conical center hole 151, a bearing 54 mounted in the conical center hole 151 of the trim 55, a turbine wheel 52 having a wheel shaft 53 supported in the bearing 54, a rack 56 mounted within the pot body 5 to carry charcoal etc., and a grid 57 supported on the pot body 5 at the top to carry food for baking.

It is to be understood that the drawings are designed for purposes of illustration only, and are not intended as a definition of the limits and scope of the invention disclosed.

I claim:

1. A baking pot comprising:

a pot body having a bottom side and a hot air inlet at the center of the bottom side;

a trim mounted in the hot air inlet of said pot body, having a conical center hole;

a bearing mounted in the conical center hole of said trim;

a turbine wheel having a wheel shaft turned in said bearing;

a drip plate mounted within said pot body above said turbine wheel, said drip plate comprising an annular recess around the border, a plurality of radial oil grooves and radial ribs alternatively arranged at the center and surrounded by said annular recess, said radial grooves respectively downwardly slope from the center of said drip plate to said annular recess for guiding collected grease to said annular recess, each radial rib having a plurality of air vents for passing hot air from said hot air inlet;

a grid mounted on said pot body above said drip plate; and a pot cover covered on said pot body over said grid.

2. The baking pot of claim 1 further comprising a rack mounted within said pot body and suspending between said drip plate and said grid.

3. The baking pot of claim 1 wherein said pot cover comprises a rotary knot, a plurality of air vents equally spaced around said rotary knob, and a shutter plate fastened to said rotary knot and turned by it to close/open the air vents of said pot cover.

* * * * *